May 24, 1955
H. L. POHNDORF
2,709,065
REGULATOR VALVE AND CLOSURE MEMBER THEREFOR
Filed June 9, 1951
2 Sheets-Sheet 1
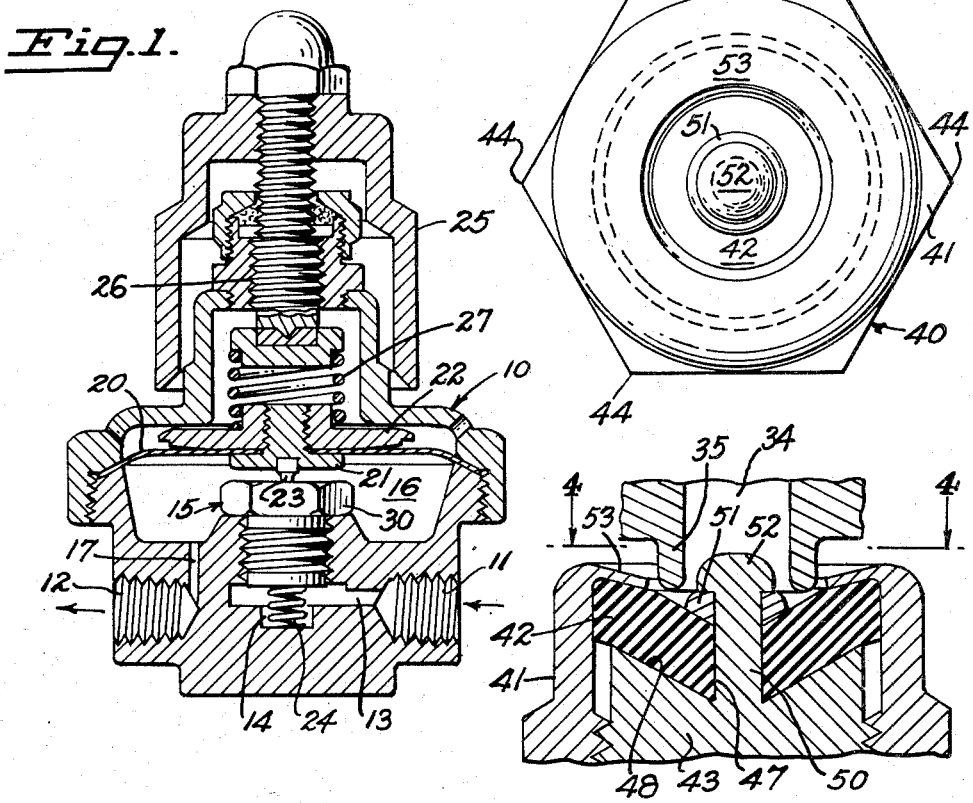
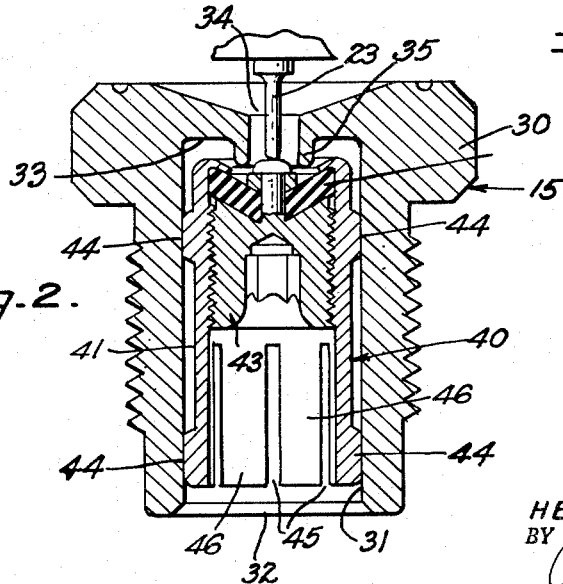
INVENTOR.
HENRY L. POHNDORF
BY
ATTORNEY

# United States Patent Office 2,709,065
Patented May 24, 1955

2,709,065

REGULATOR VALVE AND CLOSURE MEMBER THEREFOR

Henry L. Pohndorf, El Cerrito, Calif., assignor to National Welding Equipment Co., San Francisco, Calif., a corporation of California Application June 9, 1951, Serial No. 230,773

1 Claim. (Cl. 251—333)

This invention relates to an improved regulator valve and closure member therefor.

Ordinary valve closures will not work in regulators which are used to reduce the pressure of highly compressed gases from values of two or three thousand pounds per square inch, because leakage would occur wherever there were slight surface scratches or unevenness. Leakage is prevented by having one closure member of metal and the other of a soft, resilient material that yields under the pressure of the metal member. As the metal member presses into the soft member, all avenues of escape for the gas are closed.

The problem has been that the soft, resilient member was deformed and rapidly worn out by the action of the metal member and by the shearing stresses of the gas stream against it. In some cases the gas has gouged chunks out of the soft member, especially when the valve opened and there was a sudden onrush of gas. In other cases, the gas has gotten in behind the soft closure member and has torn it out from its mounting. In all cases, the soft members have worn out soon and it has not been long before they have begun to leak and have had to be replaced.

My invention has solved these problems by providing a valve whose soft closure member has a concave surface, preferably conical. This shape protects the soft member from wear and harmful deformation by the metal member, and the shearing stresses produced by the gas. Its shape also guards it from the distorting and tearing action of the gas, and a novel type of mounting on the regulator valve seat prevents the gas from getting behind the soft member and tearing it out.

In the drawings:

Fig. 1 is a view in elevation and partly in section of a gas-pressure regulator that includes a valve embodying the principles of this invention.

Fig. 2 is an enlarged view in elevation and in section of the valve shown in Fig. 1.

Fig. 3 is a further enlarged view of a portion of the valve.

Fig. 4 is a view in section taken along the line 4—4 of Fig. 2.

Figure 5:
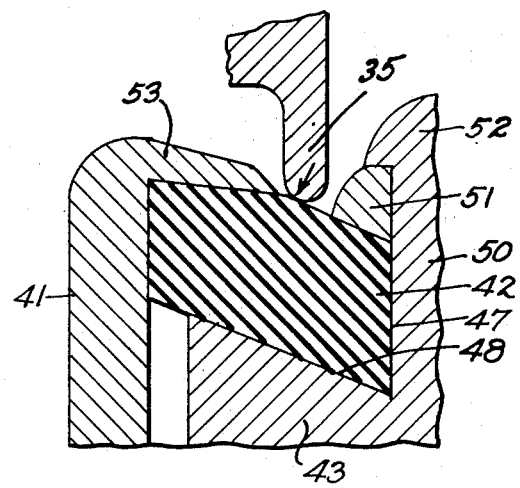
Fig. 5 is an enlarged view of a portion only of the valve in its fully closed position.

Gas enters the regulator 10, at high pressure, through an inlet 11 and issues from the outlet 12 at a low pressure. Its path leads from the inlet 11 through a passageway 13 into a high-pressure chamber 14, from where it passes through a valve 15 (the subject of the present invention), into a low-pressure chamber 16, and to the outlet 12 via a passageway 17.

The regulator 10 is of the diaphragm type, its diaphragm 20 forming one side of the low-pressure chamber 16. The diaphragm 20 may be mounted between a base member 21 and a diaphragm plate 22 whose stem 23 projects down into the valve 15 and opens it against the pressure of a spring 24. The output pressure of the gas issuing from the regulator outlet 12 is adjusted by changing the size of the valve 15 opening. For this purpose, the operator turns a handle 25 that moves an adjusting screw 26 against one end of a spring 27, increasing or decreasing the tension of the spring against the diaphragm plate 22. This causes the stem 23 to move up or down, varying the opening of the valve 15.

The assembly of the valve 15 is shown in Fig. 2. It is an improvement over the valve described and claimed in the pending application by George L. Hammon, Serial Number 733,924, filed March 11, 1947. Its hollow housing 30 is threaded into the body of the regulator 10, and has a cylindrical bore 31 extending from its open lower end 32 to an upper end wall 33. The wall 33 has a small axially-extending nozzle opening 34, bounded by a depending annular rim 35, which is the rigid stationary part or metal seat of the valve 15.

The movable valve piston 40 includes a hollow sleeve 41 having a resilient closure or seat member 42 that rests on a supporting base 43 which is threaded into the sleeve 41. The sleeve 41 is slidably supported inside the bore 31 by a plurality of reduced area contact bearing faces 44. At its lower end the sleeve 41 is cut by a plurality of axial slots 45 to form fins 46 in between the slots. The fins 46 spring outward slightly maintaining the bearing faces 44 in light yielding slidable contact with the bore 31, thereby preventing the sleeve 41 from chattering. The reduced area contact bearings, slots, and fins are all claimed in the above mentioned application by George L. Hammon.

The resilient closure member 42 is preferably a concave or frusto-conical annulus of neoprene or other similar material, with a central opening 47 therethrough. The upper face 48 of the base 43 that supports the member 42 is also preferably conical except for a central upwardly projecting stud 50. The face 48 need not be conical, so long as the upper face of the member 42 is concave or conical when the valve is assembled.

The conical member 42 is assembled on the face 48 by slipping it down over the stud 50 which passes through the opening 47. A metal washer 51 may then be placed around the end of the stud 50 against the member 42 and then the stud is flattened to form a head 52 that retains the washer 51 and holds the neoprene closure member 42 snug against the conical face 48 of the base 43, preserving its conical shape. The upper lip of the sleeve 41 is spun over at its upper end to provide an inturned annular flange 53. Then the base 43 is threaded into the sleeve 41, until the soft closure member 42 is forced snugly up against the flange 53 and is compressed somewhat against it. It is then impossible for the gas to get under or behind the member 42 or to blow it out of the piston 40.

Figure 7:
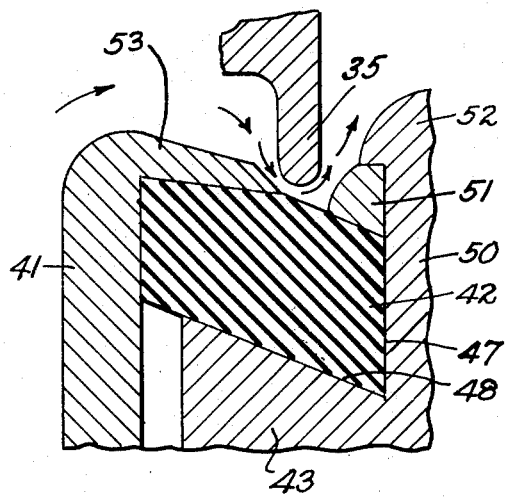
Fig. 7 is a view similar to Fig. 5 showing the improved valve in a partly open position.

The valve 15 is opened when the stem 23 pushes against the head 52 and forces the piston 40 downwardly. The closed position of the valve 15 is shown in Fig. 5, and the open position is shown in Fig. 7. When the valve is open, the gas follows the path of the arrows in Fig. 7, passing around the upper end flange 53 of the piston, going between the rim seat 35 and the resilient seat member 42, and then going out through the nozzle 34.

Figure 6:
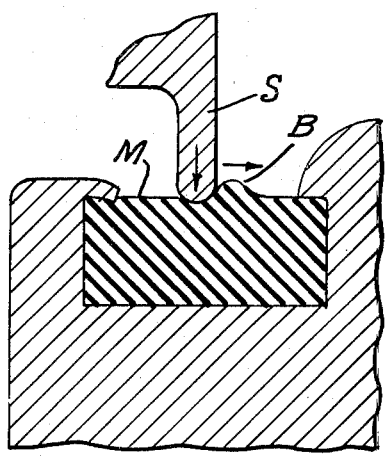
Fig. 6 is a view similar to Fig. 5, showing the resolution of stresses in a prior art device.

The concave shape of the face of the member 42 causes the mechanical pressure of the seat 35 to be exerted outwardly at an angle as shown in Fig. 5, where the arrow indicates the resultant force of the rim seat 35 against the resilient seat member 42. Moreover, since the seat 35 pushes perpendicularly against the soft member 42, which lies at an angle, it tends to stretch the member 42 outwardly, away from the center. This action contrasts strikingly with that exhibited by a flat closure member like the member M shown in Fig. 6. There the seat S pushes directly down on the member M, and since the resilient material has certain characteristics like a liquid, it forms the ripple or ridge B. This deformation weakens the member S, especially since the first onrush of gas across the seat is also toward the center and accentuates the ridge B temporarily. Sometimes this onrush of gas gouges out the material forming the ridge B, destroying the usefulness of the valve. This can be seen by comparing Figs. 6 and 8.

As Figs. 5 and 7 show, the force of the seat 35 against the member 42 is resolved radially outwardly, while the gas moves radially inwardly. A relatively small portion of the surface of the member 42 is exposed between the flange 53 and the washer 51, and since the member 42 is inclined, the path of the gas tends more to press in against it instead of blowing across it and raising ripples. There is, therefore, no ridge formed. The inclination of the surface of the member 42 and the relatively small area that is exposed both serve to minimize damage from gas flow.

Figure 8:
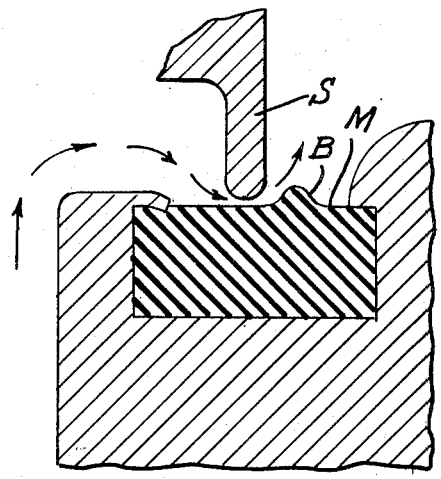
Fig. 8 is a view similar to Fig. 6, showing a prior art valve in a partly open position.

Furthermore, when the gas reaches more of an equilibrium, its pressure tends more strongly to bear down against the member 42, keeping it smooth, whereas in Fig. 8 the prior art form, the pressure at equilibrium would still tend to raise the ridge B. My invention, therefore, resolves the forces of the seat and of the gas in a manner that prevents the member 42 from being deformed or damaged. This also prevents undue wear, thereby insuring that the member 42 will have a long life with consistent performance.

I claim:

In a valve for high pressure gas the combination of a valve housing having a cylindrical bore with a wall closed at one end except for an axial opening therethrough; a stationary seat depending around said opening and terminating at its lower end in a rounded annular rim that is generally semicircular in cross-section; a piston movable in said bore toward and against said seat, said piston comprising a tubular sleeve member with a radially inturned end extending conically inward and back axially so as to present a generally concave conical surface; an imperforate base member threaded into said sleeve, said base member having an axial stud projecting upwardly from a conical concave surface; a resilient closure member compressed between said radially inturned end and said concave upper surface of said base to provide a conically concave surface adapted to engage said seat; and a washer between said stud and said resilient closure member, said stud being turned over to compress said washer down and thereby hold said resilient member against said concave surface of said base member, the distance between the outer rim of said washer where it engages said resilient member and the inner rim of said radially inturned sleeve where it engages said resilient member, being but slightly larger than the cross-sectional radial thickness of said seat rim, whereby gas under high pressure passing between said seat and said closure member follows the generally concave path and then turns upwardly into said axial opening without deforming the surface of said closure member.

References Cited in the file of this patent

UNITED STATES PATENTS

| | | |
|---|---|---|
| 1,789,476 | Riegger | Jan. 20, 1931 |
| 1,956,787 | Birch | May 1, 1934 |
| 1,973,744 | Brown | Sept. 18, 1934 |
| 2,005,445 | Wiedhofft | June 18, 1935 |
| 2,201,513 | Ackerman | May 21, 1940 |
| 2,205,533 | Sangdon | June 25, 1940 |
| 2,215,597 | Semon | Sept. 24, 1940 |
| 2,290,177 | Grant | July 21, 1942 |
| 2,447,510 | Langdon | Aug. 24, 1948 |

FOREIGN PATENTS

| | | |
|---|---|---|
| 98,388 | Switzerland | Mar. 16, 1923 |
| 399,510 | Great Britain | Oct. 6, 1932 |